O. T. BRADBURY.
Sawing-Machines
No. 148,282.   Patented March 10, 1874.
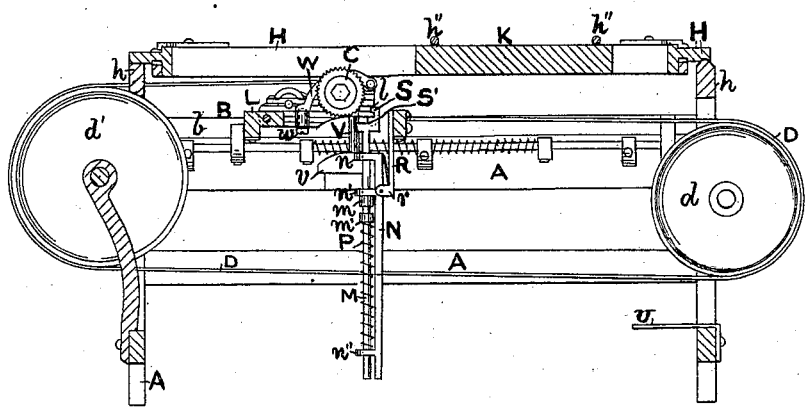
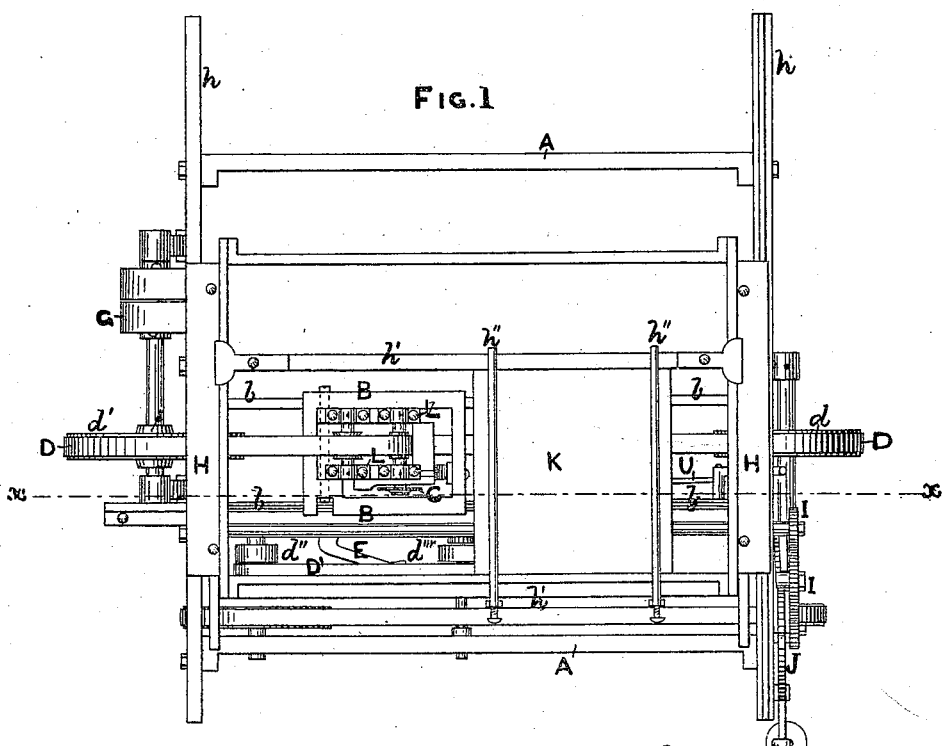
Witnesses:
A. McCallum
J. Y. Knight
Inventor:
Otis T. Bradbury,
by W. B. Richards,
atty.

UNITED STATES PATENT OFFICE.

OTIS T. BRADBURY, OF GALESBURG, ILLINOIS, ASSIGNOR TO GEORGE FULLER, OF HALLOWELL, MAINE.

IMPROVEMENT IN SAWING-MACHINES.

Specification forming part of Letters Patent No. 148,282, dated March 10, 1874; application filed February 7, 1874.

*To all whom it may concern:*

Be it known that I, OTIS T. BRADBURY, of Galesburg, in the county of Knox and State of Illinois, have invented certain Improvements in Sawing-Machines for Sawing Oil-Cloth-Print Blocks, of which the following is a specification:

The nature of my invention relates to improvements in machines for sawing blocks of wood on one of their faces into squares from which oil-cloth printing may be executed; and the invention consists in pivoting the saw-carrying frame at one side, and placing beneath the free side a spring, by means of which the saw may be made to cut at equal depths upon blocks having uneven or irregular surfaces, said spring being further arranged in connection with other devices, so that they will hold the saw and its carrying-frame up into working position while they are reciprocated in one direction across the main frame, and drop them down free from the block being operated upon while being reciprocated back in the opposite direction, an adjustable gage being also arranged, in relation to the saw, in such manner that the depth of cut may be regulated, all as hereinafter fully described.

In the accompanying drawings, Figure 1 is a top view of a machine embodying my invention; and Fig. 2 is a vertical sectional view of Fig. 1 on the plane of the line $x\ x$.

Referring to the parts by letters, A represents the main supporting-frame, constructed similar to the ordinary frames of sawing-machines of this class, in which a circular saw is hung in a frame which reciprocates back and forth across the main frame, and the article to be sawed is moved distances, which can be regulated, across the track of the saw for the purpose of regulating the distance of the successive cuts of the saw from each other, the whole being arranged to operate automatically, and which have not been deemed necessary to illustrate very fully in the drawings, or to describe but briefly in the specifications. B is the frame carrying the circular saw C, and is reciprocated back and forth on the ways $b\ b$ by the bands D D', pulleys $d\ d'\ d''\ d'''$, and band-shipping device E, in the usual manner. G is the pulley through which power is communicated to the machine. H H is a frame resting on ways $h\ h$, on which it is reciprocated by intermittent movements back and forth, across the path of the saw C, by the well-known devices I I J. K is the block to be sawed, secured, between transverse bars $h'\ h'$ of the frame H H, by clamps $h''\ h''$. L is the saw-frame proper, carrying the saw C, with suitable arbors near one of its sides, and being pivoted at its other side by suitable bearings in the sides of the frame D, in such manner that its free end, which carries the saw, may be oscillated up and down. M is a bar, arranged to have a vertical reciprocating movement in projections $n\ n'\ n''$ from a bar, N, extending downward from the lower side of the frame B, said movement being limited by the collars $m\ m'$. P is a spring encircling the lower part of the bar M between the projection $n''$ and a collar, $m'$, on said bar M, and is arranged to exert a continued upward pressure upon the bar M. The bar N is not connected directly to the frame B, but is pivoted, at $r$, to projecting lugs from the sides and lower end of a bar, R, which is attached, at its upper end, to the frame B, thus allowing the bar M an oscillating movement on the pivot $r$. The upper end of the bar M has two shoulders, S S', on its side next the frame L, the upper one, S, being formed so as to engage with a recess, $l$, in the side of the frame L, the upper end of the bar M being pressed toward the frame L continually by a spring. U is an inwardly-projecting lug from the main frame A, so arranged as to strike the lower end of the bar M, when the frame B is carried to its extreme limit, to the right hand. V is a projecting lug from the lower side of the frame L, and is so arranged as to slide up on a block, $v$, when the frames L and B are carried to their extreme limit, to the left-hand side of the main frame. W is a guard or guide for regulating the depth of cut of the saw C. It is a bar of curved form, as plainly shown in the drawings, pivoted at one end to the frame L, and its other end resting on a set-screw, $w$, by means of which it may be adjusted.

The operation of my invention is as follows: The block to be sawed being secured in place, as hereinbefore described, in the frame H H, and the saw C and its carrying-frames being at the left-hand side of the main frame, with the lug V elevated by the block v, and the free side of the saw-frame L thereby elevated until it rests in the upper seat S in the upper end of the bar M, the frames B and L are then ready to traverse across the main frame A A, and it will be plainly seen that the gage W will regulate the depth of cut of the saw, and that the free end of the frame L may be depressed by the yielding of the bar M, so as to pass over uneven surfaces upon the block being operated upon, and that the said spring-bar M will, at the same time, hold the frame L and saw C constantly up to their work while going to the right hand. When the right-hand side of the frame A is reached, the lower end of the bar N will strike the projection U, thus drawing back the upper end of the bar M, so that the frame L will drop from the rest S to the rest S', lowering the saw C from contact with the block K while the frames L and B traverse or return to their original position, where the frame L is again elevated to bring the saw into working position by the lug V and block v, the block K and frame H H being moved one space over for the next cut by the automatic devices I I and J, which, being common, are not described fully; neither are the automatic devices for reciprocating the saw-frames described fully, as they are well known.

I claim—

1. The saw-frame L, pivoted within the reciprocating frame B, substantially as described, and for the purpose specified.

2. The combination of the adjustable guard or guide W and saw C with the frames L and B, substantially as and for the purpose specified.

3. The spring-bar M, when combined and arranged to operate with the frames L and B, substantially as described, and for the purpose specified.

4. The spring-bar M, constructed as described, and arranged to operate with the frames L and B, projection U, lug V, and block v, substantially as and for the purpose specified.

OTIS T. BRADBURY.

Witnesses:
A. H. ALLEN,
F. M. WHITE.